(12) United States Patent
Clarijs et al.

(10) Patent No.: US 10,415,008 B2
(45) Date of Patent: Sep. 17, 2019

(54) METHOD FOR THE PREPARATION OF A WATER-SOLUBLE EXTRACT OF A VEGETABLE BIOMASS

(71) Applicant: Terra Vitis Innovations B.V., NR Heerde (NL)

(72) Inventors: Johannes Albertus Laurentius Clarijs, NR Heerde (NL); Johannes Adrianus Antonius Marijnissen, NR Heerde (NL)

(73) Assignee: Terra Vitis Innovations B.V., Heerde (NL)

( * ) Notice: Subject to any disclaimer, the term of this patent is extended or adjusted under 35 U.S.C. 154(b) by 0 days.

(21) Appl. No.: 15/562,598

(22) PCT Filed: Mar. 30, 2016

(86) PCT No.: PCT/NL2016/050218
§ 371 (c)(1),
(2) Date: Sep. 28, 2017

(87) PCT Pub. No.: WO2016/159767
PCT Pub. Date: Oct. 6, 2016

(65) Prior Publication Data
US 2018/0355295 A1 Dec. 13, 2018

(30) Foreign Application Priority Data

Mar. 30, 2015 (NL) .................................. 2014551
Apr. 13, 2015 (NL) .................................. 2014623

(51) Int. Cl.
*A61K 36/28* (2006.01)
*C12G 1/02* (2006.01)
(Continued)

(52) U.S. Cl.
CPC .................. *C12G 1/02* (2013.01); *A23B 4/20* (2013.01); *A23B 7/154* (2013.01); *A23L 3/3472* (2013.01); *C12H 1/14* (2013.01); *C12G 2200/21* (2013.01)

(58) Field of Classification Search
CPC ............................ A61K 36/28; A61K 2236/39
See application file for complete search history.

(56) References Cited

U.S. PATENT DOCUMENTS

| 2003/0108493 A1 | 6/2003 | Henry et al. |
| 2009/0087501 A1 | 4/2009 | Cummins |
| 2012/0251462 A1* | 10/2012 | Trierweiler ............ A61K 36/53 424/48 |

FOREIGN PATENT DOCUMENTS

| DE | 198 27 830 A1 | 12/1999 |
| KR | 2009-0109648 A | 10/2009 |
| WO | 2005/018333 A1 | 3/2005 |

OTHER PUBLICATIONS

Reanal Finomvegyszergyar, HU-208255 B, bibliographic information in English, 1993.*
(Continued)

*Primary Examiner* — Rosanne Kosson
(74) *Attorney, Agent, or Firm* — Casimir Jones, SC; Robert A. Goetz

(57) ABSTRACT

The present invention relates to a method for the preparation of a water-soluble extract based on a vegetable biomass of the *Melissa officinalis* family, which extract is used as a sulphite substitute in the aforesaid winemaking process, which method comprises one or more of the following steps: a) harvesting the herb, b) drying the herb obtained in step a), c) extracting the dried herb obtained in step b), wherein the aforesaid extraction step c) comprises at least two sub steps, a first sub step comprising a first extraction step with water, wherein the aqueous phase thus obtained functions as the (Continued)

starting material for the second sub step comprising an extraction step with an organic solvent, wherein the aqueous phase is acidified before the second extraction step.

10 Claims, 3 Drawing Sheets

(51) Int. Cl.
*A23L 3/3472* (2006.01)
*A23B 4/20* (2006.01)
*A23B 7/154* (2006.01)
*C12H 1/14* (2006.01)

(56) References Cited

OTHER PUBLICATIONS

Kim et al., "Response surface optimised extraction and chromatographic purification of rosmarinic acid from *Melissa officinalis* leaves," Food Chem 121:521-526, 2010.*

International Search Report and Written Opinion, International Application No. PCT/NL2016/050218, dated Dec. 12, 2016.

Velicanski, A. et al. "Antioxidant and Antibacterial Activity of the Beverage obtained by fermentation of sweetened Lemon Balm (*Melissa othcinalis*) tea with symbiotic consortium of bacteria and yeasts" Food Technol. Biotechnol, Jan. 1, 2014, pp. 420-429.

* cited by examiner

METHOD FOR THE PREPARATION OF A WATER-SOLUBLE EXTRACT OF A VEGETABLE BIOMASS

FIELD OF THE INVENTION

Description

The present invention relates to a method for the preparation of a water-soluble extract of a vegetable biomass. The present invention further relates to a method for the preparation of low-alcoholic beverages, in particular wine, using grapes, which grapes are subjected to a number of process steps, inter alia comprising pre-processing, in particular crushing and pressing and possibly the removal of the stems, fermentation, maturing and finally bottling, possibly with interim filtration. The present invention further relates to the use of such an herbal extract.

The winemaking process is a very old process, in which grapes are used, from which grapes the stems may be removed. The grapes are crushed in a press, whereupon the mass thus formed, also referred to as must, is pumped into a fermentation vessel. In the conventional process, sulphite is added to prevent oxidation of the must. Subsequently a first fermentation takes place, in which sugars are converted into alcohol under the influence of yeasts. After some maturing, solid components are generally removed from the wine, in the course of which process the wine may be transferred to other vessels. To obtain a clear wine, the wine is subsequently clarified, for example using proteins, gelatine and bentonite. Finally, the wine is bottled and prepared for transport to the consumer.

Food products, such as fish and meat are natural products that are perishable. Such deterioration, in particular, has the result that the shelf life of the nutrient media is limited. In order to counteract the deterioration such nutrient media is usually stored at low temperatures. It is thus common, for example, to store food items in a refrigerated space, such as a refrigerator. Freshly prepared and eaten foods often do not need to be conserved. Foods naturally contain not only water but also nutrients in the form of carbohydrates, proteins and fats. This combination produces, especially if there is also sufficient oxygen present, good conditions for the growth of micro-organisms, whereby the deterioration can occur.

In practice (artificial) preservatives are being used, wherein the substances permitted in food usually have an E-number in the range of 200-299. The adverse effects of such (artificial) preservatives to humans are, on the long term, not fully clear. In addition, there exists at consumers a need for the application of natural preservatives in food items. The addition of sulphite is legally permitted in the Netherlands and Europe, but there is a need to reduce the amount of sulphite, or to prevent the use thereof. However, the use of sulphite is not limited to the wine-making process referred to above but is also used in the meat processing and in the potato industry.

Description of the Related Art

From International application WO 2005/087244 there is known an antimicrobial composition based on a vegetable extract, which composition is used for preparing a medicament for treating microbial infections in humans.

US application US 2003/138537 relates to a method for the preparation of additives containing naturally occurring antioxidants, such as rosmarinic acid and 3-(3,4-dihydroxyphenyl) lactic acid. Such additives comprise water-soluble extracts obtained from plant materials from the Labiatae family. The Labiatae family includes, inter alia, Acinos, Calamintha, Clinopodium, Glechoma, Hyssopus, Lavandula, Lycopus, Melissa, Mentha, Nepeta, Origanum, Prunella, Rosmarinus, Salvia, Satureja, and Thymus. The method known from US application US 2003/138537 comprises a number of steps: (a) contacting the plant biomass with hot water to form a water-soluble crude extract; (b) adjusting the pH of the crude extract to between about 1.7 and 3.5 to form an acidified plant extract; (c) adding a water-immiscible organic solvent to the acidified plant extract; (d) extracting the antioxidant compounds into the organic solvent; and (e) isolating the organic solvent to provide the improved water-soluble plant extract. The organic solvent is selected from the group consisting of ethyl acetate, n-propyl acetate, isopropyl acetate, n-butyl acetate, sec-butyl acetate, t-butyl acetate, diethyl ether, and methyl t-butyl ether. The method disclosed in US application US 2003/138537 further comprises: (f) adding a basic aqueous solution, such as sodium hydroxide, sodium bicarbonate, potassium hydroxide, ammonium hydroxide, and sodium carbonate, to the extract isolated in step (e) in an amount sufficient to extract the water-soluble antioxidants into the aqueous phase, wherein the pH of the extract is between about 6.5 and 7.5, and (g) loading the aqueous phase onto a reversed-phase matrix; and (h) eluting the water-soluble antioxidants. In the final extract rosmarinic acid is present in an amount between about 10 and 50 percent by weight.

A similar process for the isolation of rosmarinic acid from plants comprising starting from plants or parts of the plants of balmmint (*Melissa officinalis*) has been disclosed in U.S. Pat. No. 4,354,035. The method disclosed therein comprises extracting the crushed plants or parts of the plants one to three times with 20 to 30 times the amount of water at 80° C. to 100° C. for 30 to 60 minutes with stirring, acidifying the extract of a pH of 2 to 2.5, thereafter extracting the acidified aqueous extracts with an organic solvent, such as diisopropylether or diethylether, separating the solvent by evaporation, stirring the residue with water at 40° C. to 80° C. for 20 to 40 minutes, purifying the resulting solution and separating crystalline rosmarinic acid by reducing the volume of the solution and storing the solution at 2° C. to 8° C.

KR 2011/0026090 relates to a method for producing grape wine for improving colour and flavour and to ensure high polyphenol content, the method comprising the following steps: a step of crushing grapes; a step of adding juicing foil to the crushed grape; a step of adding sugar to adjust sweetness to 20-25 [deg.]Brix; a step of adding yeast to the mixture and performing first fermentation; a step of juicing the primary ferment and filtering; and a step of maturing. The grape wine further contains 0.5-10 weight parts of rosemary, lavender, time, lemon balm, or mint.

U.S. Pat. No. 3,082,089 relates to a process for preparing alcoholic beverage wherein several antioxidants such as isoamyl gallate, propyl gallate, buty-rated hydroxyanisol, butyrated hydroxytoluene and kojic acid have been used to prevent an excessive oxidation of the alcoholic beverages. The amount of kojic acid to be added is from 0.0001 to 0.1%, preferably 0.005 to 0.01 percent by weight of the wine.

WO 2009/013757 relates to a water-in-oil antioxidant composition to be used in fried or baked products, wherein the water-in-oil antioxidant composition comprises a water soluble antioxidant selected from the group consisting of ascorbic acid, citric acid, L-ascorbate (Vitamin C), erythrobic acid, lactic acid, ellagitannin, chlorogenic acid, anthocyanin, water soluble antioxidant herb or plant extract, wherein the herb extract is selected from the group consisting of basil, lemon balm {*Melissa officinalis*), mint, rosemary, sage, savory, marjoram, oregano, thyme, lavender, and perilla extracts.

WO 2014/085946 relates to a 50% concentrated antioxidant natural liquid composition containing totally natural substances including both European and native medicinal plants, such as such as peppermint (*Mentha piperita*), small-leaved lime (*Tilia cordata*), lemon balm (*Melissa officinalis*), chamomile (chamomilla recutita), St John's wort (*Hypericum perforatum*), lavender (*Lavandula officinalis*), basil (*Ocimun basilicum*), rosa mosqueta (*Rosa rubiginosa*), plantain (*Plantago ovata*), canelo (*Drimys winteri*), vanilla (*Vanilla planifolia*).

RU 2 405 355 relates to tea with enhanced antioxidant properties containing at least one extract from the following group: mango leaves extract (*Mangifera indica* L.), honeysuckle flower extract (*Lonicera caprifolium* L.), balm extract (*Melissa officinalis* L.), rosemary extract (*Rosmarinus officinalis* L.), padma extract (*Nelumbo nucifera* Gaertn), verbena herb extract (*Verbena officinalis* L.), salvia root extract (*Salvia officinalis* L.), ginger hand extract (*Zingiberis Ginger* L.), larch-bark extract (*Larix decidua*) or any combination thereof.

JP 2011-236149 relates to a food and beverage containing an antioxidant including at least one of plants of the families Lamiaceae, Lauraceae, Myrtaceae and Compositae, an extract of the plant or a fraction of the extract of the plant as an active ingredient.

JP 2002-020784 relates to a deterioration inhibitor for perfume by comprising an extract of *Melissa officinalis* as an active ingredient.

US application US 2003/138532 relates to a food and beverage preservative formulated to reduce growth of microbial contaminants such as bacteria and spores, which preservative is based on a combination of a cellulose fibre and an emulsifier having a pH of at least about 7.0.

SUMMARY OF THE INVENTION

The winemaking process is a natural process in which all kinds of unwanted components, which may be naturally present, can lead to a deteriorated final quality of the wine. Accordingly, the addition of additives during one or more intermediate steps of the winemaking process is a usual step for the winemakers, which additives function to keep the quality, including the taste, the odour, the colour but also the storage life more or less constant and controllable. An additive that is usual in this regard is sulphite. Sulphite is also naturally present in the grapes but it is artificially added during one or more steps by the winemakers to obtain a specific desired level. The addition of sulphite is legally allowed in the Netherlands and in Europe, but there is a need to reduce the amount of sulphite or prevent the use thereof.

Thus it is an object of the present invention to provide a substitute for sulphite in the preparation of low-alcoholic beverages, in particular wine, which substitute has a natural origin.

Another object of the present invention is to provide a natural substitute for sulphite in wine, which natural substitute does not adversely affect the taste, odour, and colour and storage life of the wine to be finally prepared.

Yet another object of the invention is to provide a substitute for sulphite in the winemaking process, which substitute has a natural origin, and which can be processed in wine, possibly in combination with other natural components, without this having an adverse effect on the wine, in particular as regards the taste, odour, colour and storage life.

Yet another object of the present invention is to provide an herbal extract that can be used in the winemaking process, in particular as a substitute for sulphite, which herbal extract has an antimicrobial effect in addition to an antioxidative effect.

DETAILED DESCRIPTION OF THE INVENTION

The present invention thus relates to a method for the preparation of low-alcoholic beverages, in particular wine, using grapes, which grapes are subjected to a number of process steps, inter alia comprising pre-processing, in particular crushing and pressing and possibly the removal of the stems, fermentation, maturing and finally bottling, possibly with interim filtration, wherein a herbal extract is added at least once during the aforesaid steps, preferably a diluted herbal extract obtained according to the present invention, which herbal extract comprises *Melissa officinalis*.

The present inventors have surprisingly found that the use of an herbal extract based on *Melissa officinalis* has an antioxidative effect in the winemaking process. The herbal extract, especially the diluted herbal extract obtained according to the present invention, may be added during one or more of the process steps mentioned in the introduction, depending on the winemaker's requirements. It is possible, therefore, to add the herbal extract directly after the steps of crushing and pressing, but it is also possible to add the herbal extract during, before or after the fermentation process. Furthermore it is possible to add the herbal extract just before the bottling step.

The present inventors have found that the herbal extract based on *Melissa officinalis* has a very good antioxidative effect, so that the addition of sulphite during the winemaking process may no longer be necessary. However, in some embodiments the presence of sulphite is needed on basis of its antimicrobial function.

The present inventors have found that it is desirable that the aforesaid herbal extract further comprises one or more additional components, which components are selected from the group of quinone inhibitor and oxidase inhibitor. Such components are in particular desirable from the viewpoint of red coloration and brown coloration of the wine to which the herbal extract is preferably added, as mentioned before. The addition of the two inhibitors preferably takes place in anaerobic conditions, in particular using nitrogen gas. Such addition takes place on the herbal extract as such. The herbal extract thus obtained is added to the beverage.

A preferred quinone inhibitor is vitamin C.

A preferred oxidase inhibitor is kojic acid.

A suitable method for the determination of kojic acid can be found in Kimura, K. ea. (2000) Determination of kojic acid in various commercial foods by HPLC. Journal of the food hygienic society of Japan 2000 vol 41 no 1 pp 70-73. A suitable method for the determination of vitamin C can be found in COMMISSION REGULATION (EEC) No 000/90 of 17 Sep. 1990, determining Community methods for the analysis of wines, pp 116-120, 3. 10.90 Official Journal of the European Communities.

The present inventors found that the addition of kojic acid preferably takes place under stirring since kojic acid is difficult to solve in an aqueous mixture.

In a special embodiment it is desirable that the aforesaid herbal extract comprises one or more natural components selected from the group of *Mentha piperita, Thymus pulegioides, Thymus vulgare* and Echinaceae root besides *Melissa officinalis*.

The addition of the aforesaid additional components has led to the preparation of an herbal extract which also exhibits antimicrobial properties besides the antioxidative properties, both of which properties are desirable in the preparation of low-alcoholic beverages, in particular wine, especially white wine. Antimicrobial properties are in particular ascribed to *Thymus vulgare* and Echinaceae root. An antioxidative effect is ascribed to *Thymus pulegioides* and *Mentha piperita*, which latter component also has an antioxidative effect. However, the present inventors are by no means bound to the aforesaid functional action of the additional vegetable components. The present inventors assume that the herbal extract according to the present invention exhibits acceptable antioxidative properties. The antimicrobial properties of the present herbal extract may be increased by the presence of sulphite, which component may originate from the raw materials, i.e. the grapes itself, or by an extra addition of sulphite.

It is desirable that total amount of *Melissa officinalis* is at least 30 wt. %, preferably at least 50 wt. %, in particular at least 80 wt. %, wherein it is furthermore preferable that the amount of *Mentha piperita* is 5-40 wt. % *Thymus pulegioides* in the amount of 1-20 wt. %, *Thymus vulgare* in an amount of 1-20 wt. %, Echinaceae root in an amount of 1-20 wt. %, in all cases based on the weight of the total amount of herbs used. In a special embodiment of the aforesaid herbal it is desirable that the aforesaid one or more additional components are present in an amount of 0.01-20 wt. %, based on the weight of the total amount of herbs used.

As already indicated before, it is possible to add the present herbal extract during one or more steps of the winemaking process, in particular at a number of different positions therein. It is desirable, however, that the dosage of the extract is carried out such that an optimum antioxidative and antimicrobial effect is obtained, in which regard it is in particular preferable if the bacteria count of the liquid during the preparation process, in particular the winemaking process, has a specific value, in particular a mesophilic aerobic bacteria count of <1 CFU/ml, yeasts <10 CFU/ml, fungi <10 CFU/ml and lactic acid bacteria <1 CFU/ml.

The present inventors have observed that the antioxidative and antimicrobial effect of the present herbal extract can be further enhanced by subjecting the wine to be made to one or more treatment steps selected from the group of ultrahigh pressure, ultrasound, UV radiation and pulsed electrical fields during the aforesaid winemaking process. The wine to be made can be subjected to aforesaid operations either separately or simultaneously, whilst it is for example possible to subject the already fermented wine to ultrasound so as to thus achieve an additional antioxidative effect. It should be understood, however, that the aforesaid operations must be regarded as an addition to the use of the present herbal extract, they can by no means obviate the need to add the herbal extract.

The present invention also relates to a method for the preparation of a water-soluble extract based on a vegetable biomass of the *Melissa officinalis* family, which extract is used as a sulphite substitute in the aforesaid winemaking process, which preparation method comprises one or more of the following steps:
a) harvesting the herb,
b) drying the herb obtained in step a),
c) extracting the dried herb obtained in step b), wherein the aforesaid extraction step c) comprises at least two sub steps, a first sub step comprising a first extraction step with water, wherein the aqueous phase thus obtained functions as the starting material for the second sub step comprising an extraction step with an organic solvent, wherein the aqueous phase is acidified before the second extraction step.

It will be understood that the harvesting, drying and extracting of the herb can be carried out by different companies. The present invention therefore relates to the processing of the herb, which herb must first be harvested to be further processed. After harvesting of the herb(s) a drying step is preferably carried out, but in a special embodiment it is also possible to subsequently subject the harvested herb to an extraction step, leaving out an intermediate drying step.

The extraction step with water takes place in a closed system, for example, wherein an aqueous flow is continuously led over a bed of herbs so as to transfer the desired biomolecules from the solid phase, in particular the bed of herbs, to the liquid phase, the aqueous phase. The bed of herbs may in that case comprise a mixture of different types of herbs, as mentioned before, wherein, in addition to *Melissa officinalis*, use is made of one or more components selected from the group of *Mentha piperita, Thymus pulegioides, Thymus vulgare* and Echinaceae root in the aforesaid step c).

It is desirable that subsequent to the aforesaid extraction step with water the aqueous phase thus obtained functions as the starting material for the second sub step comprising an extraction step with an organic solvent. The organic phase obtained in the aforesaid extraction step with the organic solvent is subjected to an evaporation step, wherein in particular the fraction obtained after the evaporation step is mixed with water to obtain an herbal extract. Preferably, butanol, n-butyl alcohol and/or iso-butyl alcohol is used as the organic solvent in the aforesaid extraction step with an organic solvent.

In a preferred embodiment the organic phase obtained in the second extraction step is subjected to an evaporation step subsequent to the aforesaid extraction step with an organic solvent, such as butanol, n-butyl alcohol and/or iso-butyl alcohol.

The fraction obtained after the aforesaid evaporation step is mixed with water to obtain an herbal extract. It is preferred that the herbal extract obtained after mixing with water is stored at a temperature in a range of 0-10° C., during a period of at least 5 hours, wherein the cold aqueous mixture of herbal extract is filtered to obtain a herbal filtrate. In a preferred embodiment the herbal filtrate obtained after the filtration step is subjected to an additional evaporation step, wherein the herbal filtrate obtained after mixing with water is stored at a temperature in a range of 0-10° C., during a period of at least 5 hours, wherein the cold aqueous mixture of herbal filtrate is filtered to obtain a purified herbal filtrate.

According to another embodiment a diluted herbal extract is obtained by diluting the purified herbal filtrate with water until a FRAP value in a range of 100.000-300.000 micromol $Fe^{2+}$/l, as measured according to method as discussed in this application, calculated on the total volume of the diluted herbal extract.

Ferric reducing ability of plasma (FRAP, also Ferric ion reducing antioxidant power) is an antioxidant capacity assay that uses Trolox as a standard. The FRAP assay is often used to measure the antioxidant capacity of foods, beverages and nutritional supplements containing polyphenols. An example of such a FRAP measurement has been disclosed in the present application.

The present inventors have furthermore found that in certain embodiments it is desirable that one or more additional components are added to the aforesaid purified herbal extract or diluted herbal extract, comprising the addition of one or more additional components, which components are selected from the group of quinone inhibitors and oxidase inhibitors, the quinone inhibitors being preferably vitamin C and the oxidase inhibitors being preferably kojic acid.

The one or more additional components are preferably added to the diluted herbal extract.

It is preferred that any solid product obtained during the aforementioned filtration steps is removed.

In a specific embodiment of the present method, in addition to *Melissa officinalis*, use is made of one or more components selected from the group of *Mentha piperita, Thymus pulegioides, Thymus vulgare* and Echinaceae root in the aforesaid step c). This means that these herbs are also harvested and optionally dried before step c) is carried out.

The harvesting of the herb is preferably carried out on a non-rainy day, and the herbs thus harvested are preferably dried as soon as possible after harvesting. If early drying is not possible, however, it is preferable to place the herb in cold storage at a temperature of less than 10° C. To increase the long-term storage life of the harvested herbs, the herbs are preserved via a drying step, wherein use is preferably made of the residual heat, for example from a biogas CHP plant. The drying preferably takes place using a so-called belt drier, by means of which a good and constant quality of dried herbs can be realised. After the herbs have thus been dried, extraction of the dried herb takes place, wherein the components essential to the special use of the present invention are concentrated.

It is thus preferable to carry out the extraction in a number of substeps, wherein the liquid extraction is carried out using an organic solvent, preferably butanol, n-butyl alcohol and/or iso-butyl alcohol. Before such extraction with an organic solvent takes place, it is desirable to adjust the pH of the mixture to be extracted to a low value, preferably pH 2. The incubation time required in that regard is preferably at least 8 hours, in particular 16-24 hours. A suitable acidification step comprises adding phosphoric acid. In certain embodiments it is desirable to carry out a filtration step after the extraction with the organic solvent, in particular before an evaporation step is carried out.

Once the liquid extraction, i.e. an extraction comprising at least two sub steps, a first sub step comprising a first extraction step with water, wherein the aqueous phase thus obtained functions as the starting material for the second sub step comprising an extraction step with an organic solvent, wherein the aqueous phase is acidified before the second extraction step, is completed, it is desirable to mix the slurry thus obtained with an aqueous medium, in a ratio of 1-50 wt. %, after the evaporation step has taken place, wherein the thus obtained aqueous mixture of extracted herbs and possibly other components, as mentioned before, is regarded as a so-called herbal preparation, which herbal preparation is marketed for use in the method for the preparation of low-alcoholic beverages, in particular wine, as described in the foregoing. The herbal preparation thus obtained is used as a sulphite substitute in the winemaking process. Another use is the food industry as will be discussed below.

The present invention furthermore relates to a method of preservation an alcoholic beverage, wherein an extract is added to the alcoholic beverage, wherein the diluted herbal extract as discussed above is added to the alcoholic beverage, in particular wine, in an amount of 0.001-5 wt. %, preferably 0.001-2 wt. %, on basis of the total weight of the alcoholic beverage.

It is preferred that the FRAP value of the alcoholic beverage to which the diluted herbal extract has been added, is within a range of 1500-3000 micromol $Fe^{2+}$/l, calculated on the total volume of the alcoholic beverage.

In addition, it is also preferred that the amount of oxidase inhibitors of the alcoholic beverage to which the diluted herbal extract has been added, is within a range of 50-250 mg/l, calculated on the total volume of the alcoholic beverage.

In addition, it is also preferred that the amount of quinone inhibitors of the alcoholic beverage to which the diluted herbal extract has been added is within a range of 50-150 mg/l, calculated on the total volume of the alcoholic beverage.

In addition, it is also preferred that the amount of sulphite of the alcoholic beverage to which the diluted herbal extract has been added is <10 mg/l, calculated on the total volume of the liquid aqueous medium.

It will be understood, however, that the wine obtained by using the present winemaking process may contain traces of sulphite, which traces are ascribed to the fact that they are naturally present. Such amounts will generally be lower than the levels measured in commercial wines to which sulphite have been artificially added.

The present invention in particular relates to the use of a diluted herbal extract based on *Melissa officinalis* comprising one or more components selected from the group of quinone inhibitor and oxidase inhibitor as a sulphite substitute in alcoholic beverages, in particular wine.

In the aforesaid use it is in particular desirable that the diluted herbal extract further comprises one or more components selected from the group of *Mentha piperita, Thymus pulegioides, Thymus vulgare* and Echinaceae root.

The present invention in particular relates to the use of one or more additional components in the aforesaid diluted herbal extract, which components are selected from the group of quinone inhibitor and oxidase inhibitor.

According to a preferred use the FRAP value of the diluted herbal extract is in a range of 100.000-300.000 micromol $Fe^{2+}$/l, as measured according to method as discussed in this application, calculated on the total volume of the diluted herbal extract. In case the FRAP value is above the upper limit, the taste of the alcoholic beverage to which the diluted herbal extract is to be added will be deteriorated. In case the FRAP value is below the lower limit, the antioxidative effects will be minimized.

According to a preferred use the amount of the diluted herbal extract is in a range of 1 ml-20 ml, in particular 5 ml-15 ml, per liter alcoholic beverage.

According to a preferred use the amount of vitamin C as the quinone inhibitor is in a range of 50-150 mg, per liter alcoholic beverage. In case the amount of vitamin C is above the upper limit, the taste of the alcoholic beverage to which the diluted herbal extract is to be added will be deteriorated. In case the amount of vitamin C is below the lower limit, the colour of the alcoholic beverage to which the diluted herbal extracts is to be added will be deteriorated, i.e. discolouration.

According to a preferred use the amount of kojic acid as the oxidase inhibitor is in a range of 50-250 mg, per liter alcoholic beverage. In case the amount of kojic acid is above the upper limit, the taste of the alcoholic beverage to which the diluted herbal extract is to be added will be deteriorated. In case the amount of kojic acid is below the lower limit, the colour of the alcoholic beverage to which the diluted herbal extract is to be added will be deteriorated, i.e. discolouration.

In some embodiments the amount of vitamin C according to the aforementioned use as the quinone inhibitor is preferably at most 150 mg, in particular 1-50 mg, preferably 10-40 mg, per liter of wine. In another embodiment the amount of kojic acid as the oxidase inhibitor is preferably 0.01-100 mg, in particular 0.1-60 mg, per liter of wine.

The present inventors have found that the herbal extract prepared in accordance with the present method has an antioxidatieve capacity such that it can be used instead of the usual sulphite in the winemaking process. In addition to the antioxidative capacity of the present herbal extract, an antimicrobial effect is provided. Furthermore, the present herbal extract exhibits properties as regards preventing brown coloration, inactivation of enzymes, in particular Laccase and Tyrosinase. Furthermore, the use of the present herbal extract in the winemaking process results in a slight improvement of the taste, in particular as a result of the binding of so-called Off-Flavours (aldehydes). Another advantageous property of the present herbal extract is furthermore its low toxicity.

The present invention also relates to the use of the present diluted herbal extract based on *Melissa officinalis* as an antioxidant in a food medium, wherein the present diluted herbal extract preferably comprises one or more components selected from the group of quinone inhibitor and oxidase inhibitor.

Examples of such a food medium comprise one or more of the group consisting of potatoes, vegetables, fruit, meat, fish, cheese, milk products, (soft) drinks and food products derived therefrom.

A preferred use of the present diluted herbal extract based on *Melissa officinalis* as an antioxidant is in the process of the potato processing. Another preferred use of the present diluted herbal extract based on *Melissa officinalis* as an antioxidant is in the process of the meat processing.

Such a diluted herbal extract may further comprise one or more components selected from the group of *Mentha piperita*, *Thymus pulegioides*, *Thymus vulgare* and Echinaceae root.

The present invention will now be explained with reference to the table. The present invention is by no means limited to such special examples, however. The extract used was the extract prepared in accordance with the present method as described in the foregoing, which extract comprises *Melissa officinalis*.

During additional research the inhibition of the Laccase activity of the present herbal extract in comparison with sulphite, in particular inactivation of oxidase enzymes under the influence of the present herbal extract in comparison with sulphite, was studied. The research showed that the inactivation of Laccase under the influence of the present herbal extract takes place at 0.5 ml of herbal extract per liter of wine.

It can thus be concluded that the dosage of antioxidative herbal preparation is amply sufficient for effecting complete Laccase inactivation.

TABLE

| DESCRIPTION OF EXTRACT | EXTRACT/ LIT. WINE | AMOUNT OF QUINONE INHIBITOR VITAMINE C | AMOUNT OF OXYDASE INHIBITOR KJC |
|---|---|---|---|
| Eifel, young wine with high level of PPO enzymes: Laccase/ Tyrosinase bad season 2013 | 9.0 ml/L wine | 68 mg/L wine | 101 mg KJC/ L wine |
| IFV/Charrier season 2013 Test 1 | 20.0 ml/L wine | 151 mg/L wine | 90 mg/L |
| IFV/Charrier season 2013 Test 2 | 10.1 ml/L wine | 76 mg/L wine | 45 mg/L wine |
| Werner season 2013 | 8.0 ml/L wine | 60 mg/L wine | 6 mg KJC/ L wine |

The present invention will be discussed with reference to the enclosed process flow diagram. This process flow diagram covers an embodiment of the present invention.

Figure 1:
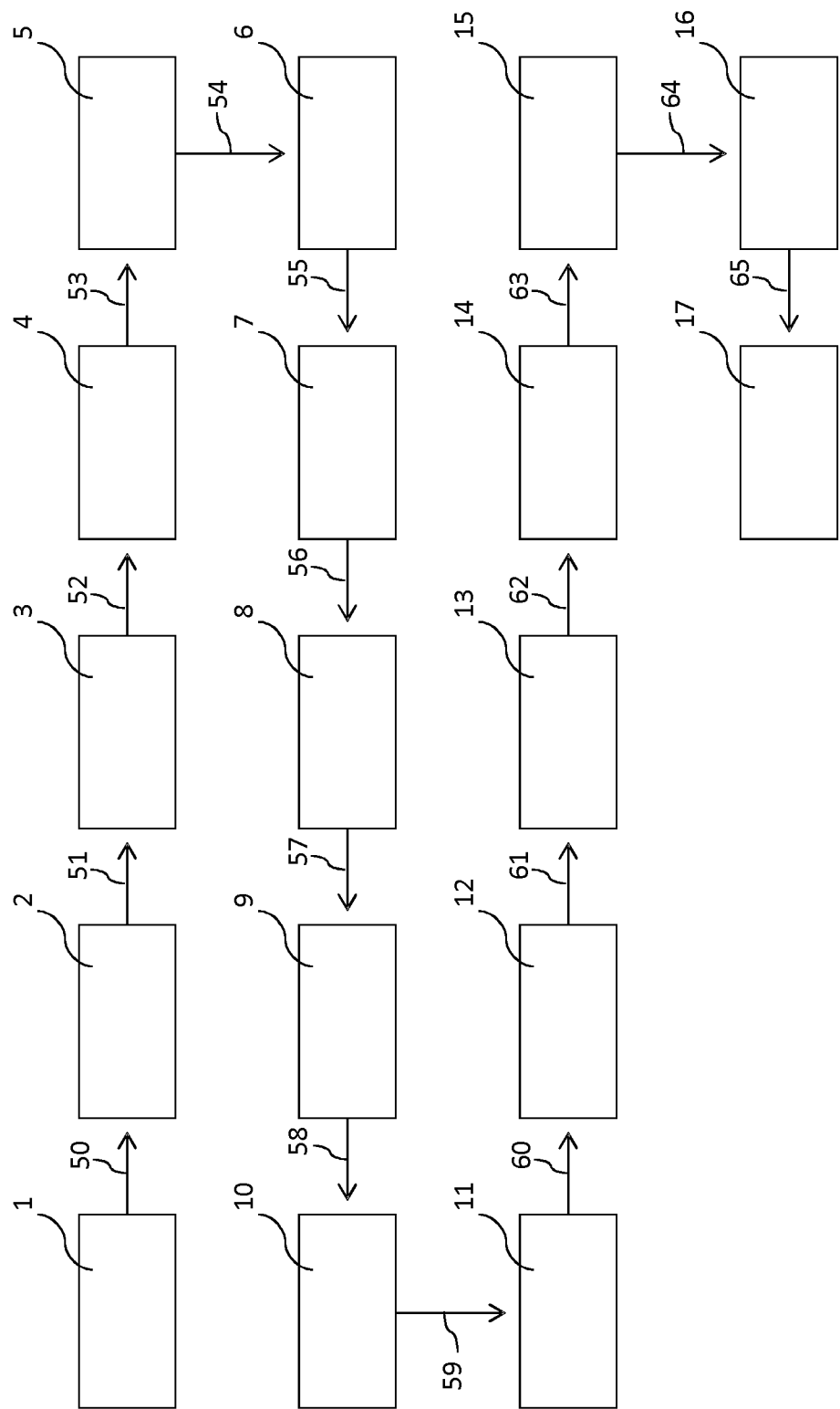
FIG. 1 is a process flow diagram according to an embodiment of the present invention.

According to FIG. 1, the herb, especially *Melissa officinalis*, is harvested as indicated by reference number 1. According to a preferred embodiment the herb is sieved and unwanted parts are removed, such as sand, stones etc. The herb thus harvested 50 is dried in unit 2, for example a band dryer. In unit 3 the dried herb 51 is then extracted with water, at room temperature, i.e. a first extraction step with water. The aqueous extract 52 is acidified in unit 4, for example by the addition of phosphoric acid until a pH of about 1.7 and 3.5 to form an acidified plant extract 53. In unit 5 this acidified plant extract 53 is filtrated and the filtrate 54 thus obtained is sent to an extraction unit 6 for carrying out an extraction step with an organic solvent. The solvent used in unit 6 is for example n-butanol. The organic phase 55 originating from this extraction step with an organic solvent is evaporated in unit 7 under vacuum conditions of about 5 mbar and at a temperature of at most 40° C. This evaporation step aims to remove a substantial part of the organic solvent used in unit 6. The concentrate or concentrated fraction 56 obtained after the evaporation step in unit 7 is brought into contact with a liquid phase, i.e. water, in unit 8. In unit 9 there is a cold storage of the aqueous mixture of herbal extract 57 at a temperature of about 4-5° C., during a period of at least 5 hours. The cold aqueous mixture 58 thus stored is filtered in unit 10. The herbal filtrate 59 is sent to a second evaporation step in unit 11. In unit 11 de remainder part of the organic solvent is removed from filtrate 59. The concentrated fraction 60 obtained after the evaporation step in unit 11 is brought into contact with a liquid phase, i.e. water in unit 12. In unit 13 there is a cold storage of the aqueous mixture 61 at a temperature of about 4-5° C., during a period of at least 5 hours and the cold aqueous mixture is filtered in unit 13 as well. The filtrate 62 thus obtained, i.e. the purified herbal filtrate, is sent to unit 14 for standardisation. Unit 14 may receive several filtrates 62 from different batches. The standardisation in unit 14 includes the dilution with water until a specific FRAP value is reached. The thus diluted and standardised stream 63, i.e. the diluted herbal filtrate, is combined with additives in unit 15. Examples of additives comprise one or more additional components, which components are selected from the group of quinone inhibitor and oxidase inhibitor, especially vitamin C is used as the quinone inhibitor and/or kojic acid is used as the oxidase inhibitor. The thus prepared extract 64 is stored in unit 16. From unit 16 several grades of extracts 65 will be delivered to the end suppliers 17.

Although the process flow diagram has been discussed for only one specific herb *Melissa officinalis*, the process flow diagram may also include one or more other natural components selected from the group of *Mentha piperita, Thymus pulegioides, Thymus vulgare* and Echinaceae root. These natural components may be processed simultaneously with *Melissa officinalis*, but may also be blended with other processed herbs in unit 14.

In addition, in some embodiments the addition of additives, such as one or more additional components, in unit 15 may also take place before the standardisation in unit 14. This means that the dilution with water in unit 14 may take place after the addition of additives. In another embodiment of the present invention the concentrate 56 may undergo only one time the steps of mixing with water, cold storage and filtration. In such an embodiment the herbal filtrate 59 is sent directly to unit 14 for standardisation. As mentioned above, unit 14 may receive several filtrates, for example filtrates that have undergone both the first evaporation in unit 7 and the second evaporation in unit 11 and filtrates that have only undergone a single evaporation step in unit 7.

Figure 2:
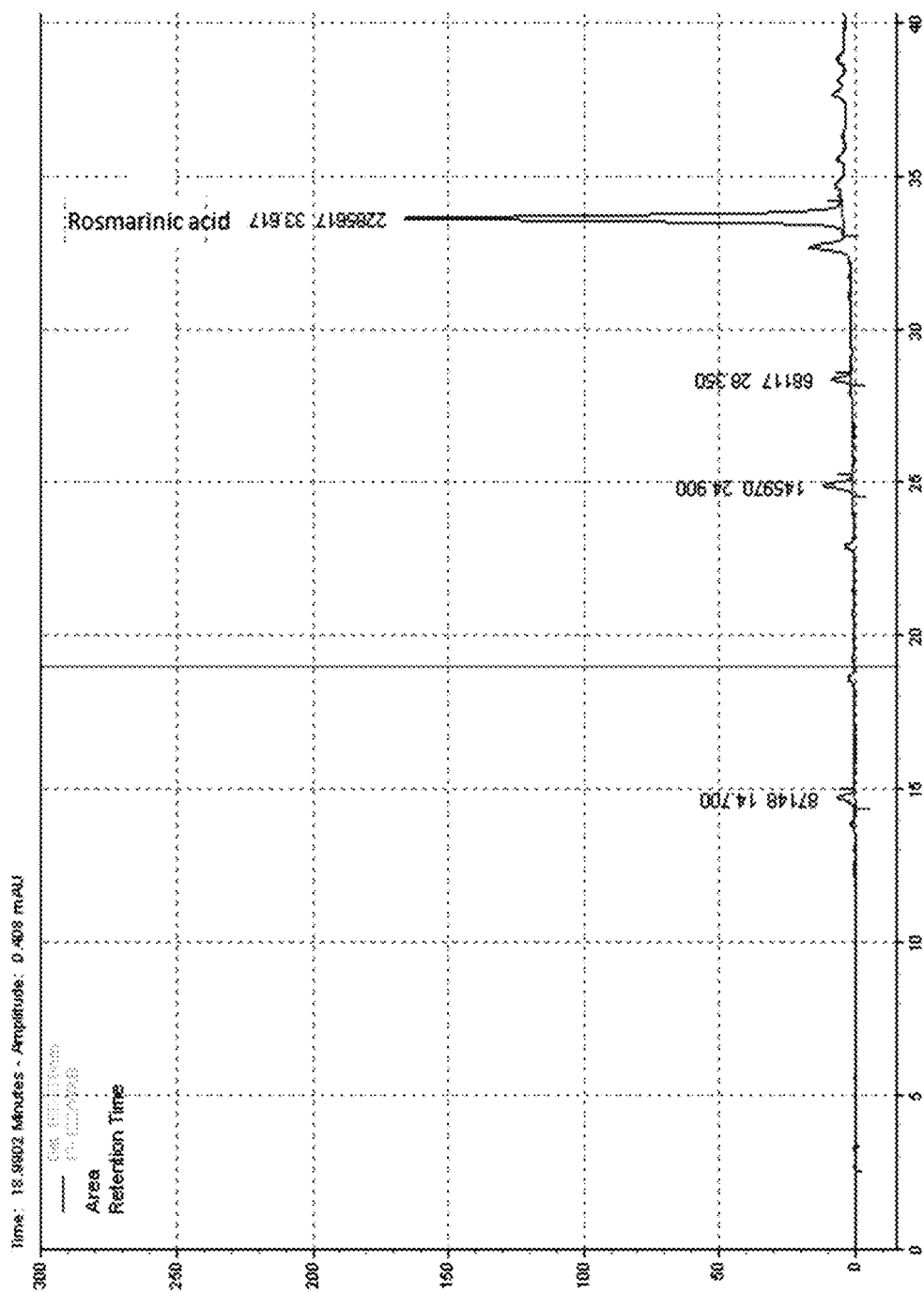
FIG. 2 is a chromatogram of the aqueous fraction obtained after extraction with an organic solvent.

As mentioned in this application, the extraction step with an organic solvent is preferably carried out with butanol, n-butyl alcohol and/or iso-butyl alcohol. The present inventors found that by using these preferred organic solvents a broad spectrum of anti-oxidant components is extracted. This can be seen with the chromatographic fingerprints of the discarded water fraction after the organic extraction, as shown in FIG. 2. The amount of rosmarinic acid in this water fraction is high. Application tests with white wine showed that the extract with high rosmarinic acid purity had a detrimental effect on the taste of the wine and did not stop brown discoloration during storage of the wine.

Figure 3:
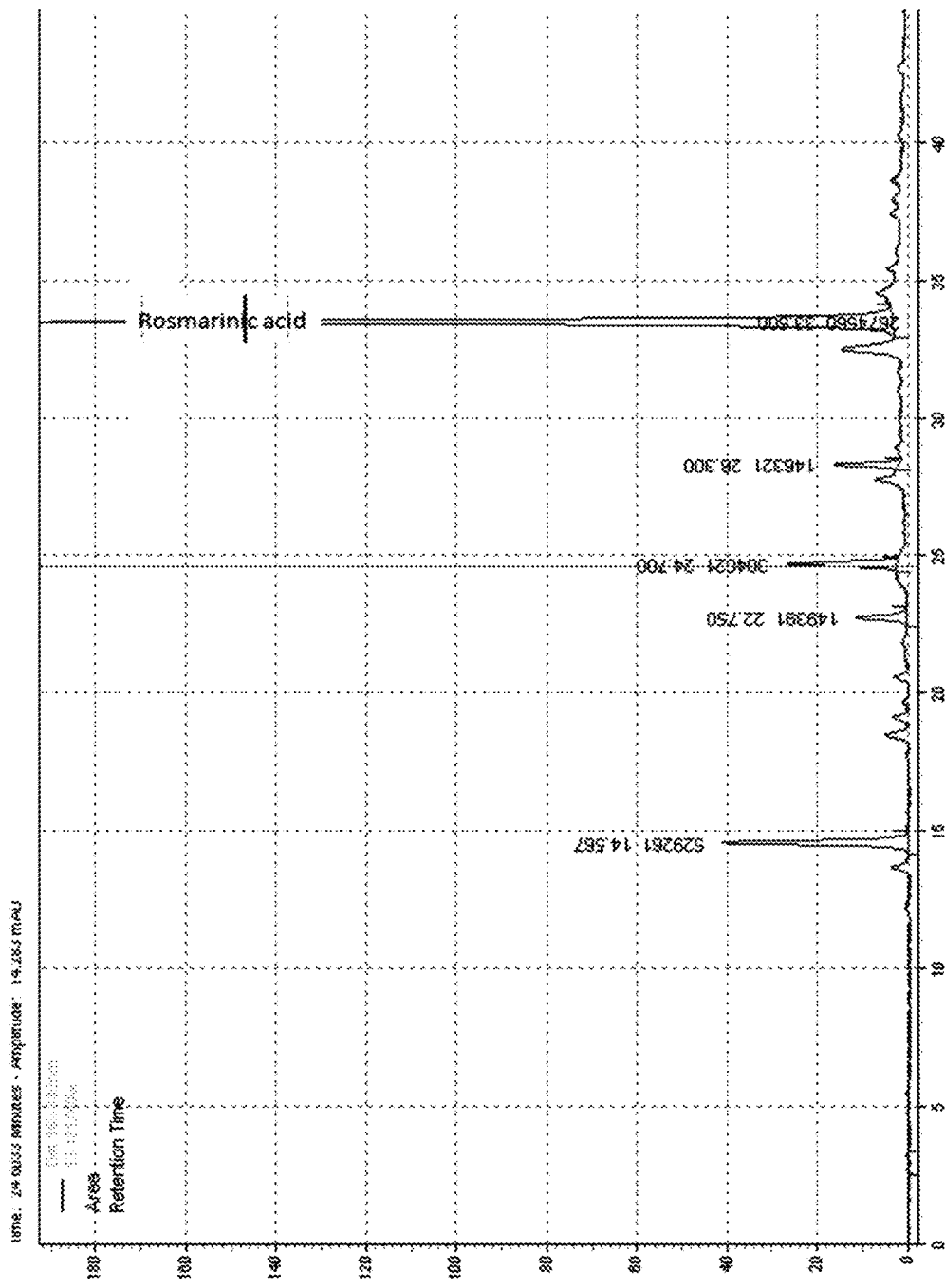
FIG. 3 is a chromatogram of the organic fraction obtained after extraction with an organic solvent.

The chromatogram of the organic phase obtained after the organic extraction step as shown in FIG. 3 shows much more peaks besides the rosmarinic acid peak. The present inventors assume that the presence of these other components provides the unexpected anti-oxidative properties of the herbal extract obtained according to the present invention.

An example of the method for measurement Ferric reducing ability—antioxidant power (FRAP) will now be discussed.

Preparing Reagents:

1. Stock solution of 300 mM acetate buffer, pH 3.6 (store at 4.c for maximum 1 month) For 100 ml:
   weigh 0.31 g sodium acetate ($C_2H_3NaO_2.3H_2O$), dissolve in ±50 ml distilled water
   add 1.6 ml acetic acid ($C_2H_4O_2$)
   add distilled water up to ±75 ml
   measure the pH, if necessary adjust to 3.6
   add distilled water up to 100 ml.
2. Stock solution of 10 mM 2,4,6-tripyridyl-s-triazine (TPTZ) (store at 4° C. for maximum 1 month) For 10 ml:
   weigh 31 mg TPTZ, dissolve in ±5 ml of distilled water
   add 34 µl HCl (36%, d=1.18 kg/l)
   add distilled water up to 10 ml.
3. Stock solution of 20 mM $FeC_3.6H_2O$ (store at 4° C. for maximum 1 month)
   For 10 ml:
   weigh 54.1 mg $FeCl_3.6H_2O$, dissolve in ±5 ml of distilled water
   add distilled water up to 10 ml.
4. Work solution: FRAP reagent
   Mix 25 ml acetate buffer (solution 1), 2.5 ml TPTZ-reagent (solution 2) and 2.5 ml $FeCl_3.6H_2O$ (solution 3).
   Place the solution at 37° C. 30 minutes before starting the analysis.

Calibration:

Weigh on the analytical balance 27.8 mg $FeSO_4.7H_2O$ in a measuring flask of 100 ml, note the weight, dissolve in a little distilled water, and add distilled water up to 100 ml Make dilutions 1/10, 2/10, 4/10, 6/10, 8/10 and 10/10

Add 225 µl of FRAP reagent in all needed wells of the 96 well plates

Add to the appropriate well 25 µl of the standard dilutions, 25 µl of distilled water for the blank, mix by carefully pipetting up and down Measure the optical density at 593 nm at 0, 5, 10, 15 and 20 minutes, incubate the plate in the spectrophotometer, place the incubator of the spectrophotometer at 37° C.

Samples:

If possible dilute the samples within the range of the calibration curve (100-1000 µmol/l $Fe^{2+}$)

Add for each sample 225 µl of FRAP reagent (37° C.) in a well of the 96 well plates Add 25 µl of the sample to the appropriate well, 25 µl of distilled water for the blank, mix by carefully pipetting up and down Measure the optical density at 593 nm at 0, 5, 10, 15 and 20 minutes, incubate the plate in the spectrophotometer, place the incubator of the spectrophotometer at 37° C.

Determine the FRAP value by recalculation with the use of the calibration curve/

The invention claimed is:

1. A method for the preparation of a water-soluble extract based on a vegetable biomass of the *Melissa officinalis* family, which extract is used as a sulphite substitute in a winemaking process, which preparation method comprises the following steps:
   a) harvesting the herb,
   b) drying the herb obtained in step a),
   c) extracting the dried herb obtained in step b), wherein the aforesaid extraction step c) comprises at least two sub: steps, a first sub: step comprising a first extraction step with water, wherein the aqueous phase thus obtained functions as the starting material for the second sub-step comprising an extraction step with an organic solvent, wherein the aqueous phase is acidified before the second extraction step.

2. The method according to claim 1, characterised in that the organic phase obtained in the second extraction step is subjected to an evaporation step subsequent to the aforesaid extraction step with an organic solvent.

3. The method according to claim 2, characterised in that the traction obtained after the aforesaid evaporation step is mixed with water to obtain an herbal extract.

4. The method according to claim 3, characterised in that the herbal extract obtained after mixing with water is stored at a temperature in a range of 0-10° C., during a period of at least 5 hours, wherein the cold aqueous mixture of the herbal extract is filtered to obtain an herbal filtrate, wherein a solid product obtained during the filtration steps is removed.

5. The method according to claim 4, characterised in that the herbal filtrate obtained after the filtration step is subjected to an additional evaporation step, wherein the dried herbal filtrate is mixed with water for a second time and is stored at a temperature in a range of 0-10° C., during a period of at least 5 hours, wherein the cold aqueous mixture of the herbal filtrate is filtered for a second time to obtain a purified herbal filtrate.

6. The method according to claim 5, characterised in that a diluted herbal extract is obtained by diluting the purified herbal filtrate with water for a third time until a FRAP value in a range of 100,000-300,000 micromol $Fe^{2+}$/L, calculated on the total volume of the diluted herbal extract is measured.

7. The method according to claim 6, further comprising the addition of one or more additional components to the purified herbal filtrate obtained in claim 6, which components are selected from the group of quinone inhibitors and oxidase inhibitors.

8. The method according to claim 1, characterised in that butanol is used as the organic solvent in the aforesaid extraction step with an organic solvent.

9. The method according to claim 1, characterised in that in addition to *Melissa officinalis*, the herb in step (a) comprises one or more pants selected from the group consisting of *Mentha piperita, Thymus pulegioides, Thymus vulgare* and Echinaceae root.

10. The method of claim 8, wherein the butanol is n-butyl alcohol or iso-butyl alcohol or the combination thereof.

* * * * *